(12) United States Patent
Fontayne (10) Patent No.: US 9,586,538 B2
(45) Date of Patent: Mar. 7, 2017

(54) LICENSE PLATE HOLDER

(71) Applicant: Diego Fontayne, Montgomery, NY (US)

(72) Inventor: Diego Fontayne, Montgomery, NY (US)

(*) Notice: Subject to any disclaimer, the term of this patent is extended or adjusted under 35 U.S.C. 154(b) by 0 days.

(21) Appl. No.: 15/091,216

(22) Filed: Apr. 5, 2016

(65) Prior Publication Data

US 2016/0297379 A1 Oct. 13, 2016

Related U.S. Application Data

(60) Provisional application No. 62/144,143, filed on Apr. 7, 2015.

(51) Int. Cl.
*A47G 1/16* (2006.01)
*B60R 13/10* (2006.01)
*B60Q 1/56* (2006.01)

(52) U.S. Cl.
CPC .............. *B60R 13/105* (2013.01); *B60Q 1/56* (2013.01)

(58) Field of Classification Search
USPC ........................................ 248/475.1
See application file for complete search history.

(56) References Cited

U.S. PATENT DOCUMENTS

| | | | | |
|---|---|---|---|---|
| 1,833,742 A | * | 11/1931 | Gallogly | B60R 13/105 40/203 |
| 1,864,641 A | * | 6/1932 | Davis | B60R 13/105 40/208 |
| 2,400,079 A | * | 5/1946 | Ducey | B60R 13/10 40/200 |
| 2,815,598 A | * | 12/1957 | Gazan | B60R 13/10 40/209 |
| 3,908,296 A | * | 9/1975 | Harrison | G09F 7/20 40/210 |
| 4,395,749 A | | 7/1983 | Poveromo | |
| 4,422,664 A | | 12/1983 | Poveromo | |
| 5,471,773 A | * | 12/1995 | Hoffman | B60Q 1/503 248/467 |
| D384,627 S | | 10/1997 | Clark et al. | |
| D384,628 S | | 10/1997 | Lake | |
| 5,813,640 A | * | 9/1998 | Koch | G09F 7/18 248/222.11 |
| 5,815,965 A | * | 10/1998 | de Greeve | G09F 7/18 40/209 |
| 5,870,841 A | | 2/1999 | Brody, II et al. | |
| D411,499 S | | 6/1999 | Porter | |
| D412,876 S | | 8/1999 | Crecelius | |
| D413,174 S | | 8/1999 | Mayer et al. | |
| D415,987 S | | 11/1999 | Romero | |
| D437,816 S | | 2/2001 | Hussaini et al. | |
| D440,194 S | | 4/2001 | Hussaini et al. | |
| D440,928 S | | 4/2001 | Hussaini et al. | |
| D441,334 S | | 5/2001 | Hussaini et al. | |
| D441,335 S | | 5/2001 | Hussaini et al. | |
| D441,704 S | | 5/2001 | Hussaini et al. | |

(Continued)

*Primary Examiner* — Monica Millner
(74) *Attorney, Agent, or Firm* — Abel Law Group, LLP (57) ABSTRACT

A license plate holder including a flexible body having a T-shape contour and a single layer of material or multilayer material including a material from the group of rubber, polychloroprene, nitrile, nitrile butadiene rubber, cyanocarbons, styrene butadiene rubber, ethylene propylene rubber and a combination thereof.

20 Claims, 6 Drawing Sheets

(56) References Cited

U.S. PATENT DOCUMENTS

| | | | |
|---|---|---|---|
| D442,130 S | 5/2001 | Hussaini et al. | |
| D443,239 S | 6/2001 | Hussaini et al. | |
| D446,759 S | 8/2001 | Leu | |
| 6,324,778 B1 * | 12/2001 | Gall | B60R 13/10 40/200 |
| D454,216 S | 3/2002 | Classen | |
| 6,481,126 B2 | 11/2002 | Paulhill | |
| 6,526,680 B1 | 3/2003 | Yu | |
| D479,161 S | 9/2003 | Halbert | |
| D489,031 S | 4/2004 | Leibman | |
| 6,720,868 B2 | 4/2004 | Flick | |
| 6,772,545 B2 | 8/2004 | Hashim et al. | |
| D496,312 S | 9/2004 | Sybilrud et al. | |
| 6,796,060 B1 | 9/2004 | Meester et al. | |
| 6,848,204 B1 * | 2/2005 | Nowak | G09F 21/04 40/200 |
| D502,434 S | 3/2005 | Leibman | |
| D528,953 S | 9/2006 | Kellermann | |
| D529,849 S | 10/2006 | Kellermann | |
| D534,110 S | 12/2006 | Kellermann et al. | |
| 7,257,912 B2 | 8/2007 | Yang | |
| D565,665 S * | 4/2008 | McGough | D20/11 |
| D566,023 S | 4/2008 | Pacleb | |
| D566,024 S | 4/2008 | Pacleb | |
| D578,049 S | 10/2008 | Son | |
| D590,311 S | 4/2009 | Pacleb | |
| D596,545 S | 7/2009 | Son | |
| D599,726 S | 9/2009 | Pacleb | |
| D601,070 S | 9/2009 | Boyce | |
| 7,594,347 B2 | 9/2009 | Anderson | |
| 7,752,785 B2 | 7/2010 | Beer et al. | |
| 7,866,071 B1 | 1/2011 | Downey | |
| D633,837 S | 3/2011 | Murray | |
| D650,314 S | 12/2011 | Pineda | |
| D651,147 S | 12/2011 | Pineda | |
| D651,548 S | 1/2012 | Pineda | |
| D652,360 S | 1/2012 | Drew | |
| 8,231,035 B1 | 7/2012 | Michael et al. | |
| 8,245,996 B1 | 8/2012 | Ciabaszewski | |
| 8,281,508 B1 | 10/2012 | Wiskow | |
| 8,438,765 B2 * | 5/2013 | Sanders | B60R 13/10 40/200 |
| 8,533,982 B2 | 9/2013 | Rousey et al. | |
| 8,543,330 B2 | 9/2013 | Taylor et al. | |
| 8,544,198 B2 | 10/2013 | Iverson | |
| 9,067,548 B1 * | 6/2015 | Korneev | B60R 13/105 |
| 9,227,667 B2 * | 1/2016 | Steinke | B62D 25/08 |
| 2003/0192210 A1 * | 10/2003 | Leibman | B60R 13/105 40/209 |
| 2006/0059735 A1 * | 3/2006 | Yeo | B60R 13/105 40/200 |
| 2006/0156595 A1 * | 7/2006 | Kasak | B60R 13/105 40/209 |
| 2007/0157495 A1 * | 7/2007 | Yang | B60R 13/105 40/201 |
| 2008/0229634 A1 * | 9/2008 | Collins | B60R 13/105 40/209 |
| 2011/0247248 A1 * | 10/2011 | Dowd | B60R 13/105 40/209 |
| 2011/0315848 A1 | 12/2011 | Risse et al. | |
| 2012/0096747 A1 * | 4/2012 | Lee Yang | B60R 13/105 40/209 |
| 2012/0227294 A1 * | 9/2012 | Weber | B60R 13/105 40/209 |
| 2013/0042966 A1 * | 2/2013 | Look | B32B 37/12 156/227 |
| 2013/0047476 A1 * | 2/2013 | Malina | B60R 13/105 40/209 |
| 2013/0057398 A1 | 3/2013 | Wen | |
| 2013/0112823 A1 * | 5/2013 | Kreft | B60R 13/105 248/205.3 |
| 2014/0133935 A1 * | 5/2014 | MacNeil | G09F 7/18 411/337 |
| 2014/0331530 A1 * | 11/2014 | Masanek, Jr. | B60R 13/105 40/209 |
| 2015/0068076 A1 * | 3/2015 | Knapschaefer | B60R 13/105 40/209 |
| 2015/0135567 A1 * | 5/2015 | Malina | B60R 13/105 40/209 |
| 2015/0135568 A1 * | 5/2015 | Knapschaefer | G09F 7/18 40/209 |
| 2015/0307046 A1 * | 10/2015 | Fritsch | B60R 19/44 293/144 |
| 2016/0221516 A1 * | 8/2016 | Martin | B60R 13/105 |

\* cited by examiner

LICENSE PLATE HOLDER

CROSS-REFERENCE TO RELATED APPLICATION(S)

The present application claims priority from U.S. Provisional Patent Application No. 62/144,143, filed Apr. 7, 2015, entitled "LICENSE PLATE HOLDER," naming inventor Diego Fontayne, and said provisional application is incorporated by reference herein in its entirety for all purposes.

BACKGROUND

Field of the Disclosure

The following is directed to a license plate holder.

Description of the Related Art

Various types of rigid objects have been marketed as license plate holders, which can attach to various vehicles in various forms and couple the license to the vehicle. The most common example of license plate holders includes frames of metal that surround a license and attach to the vehicle. However, other license plate holders exist, which are typically rigid, molded, plastic objects. Such license plate holders can have intricate constructions with various undulations, which may lead to stress risers and failure of the license plate holder. Moreover, conventional license plate holders are not typically engineered to survive exposure to a multitude of environments, and thus may be easily susceptible to chemical attack.

The industry continues to demand improvements to license plate holders.

SUMMARY

According to a first aspect, a license plate holder includes a flexible body having a T-shape contour and a first layer comprising a polymer, a second layer comprising a polymer, and a first intermediate layer disposed between the first layer and the second layer comprising a fabric. The flexible body further includes at least a first opening.

According to another aspect, a license plate holder includes a flexible body having a T-shape contour and a single layer of material selected from the group consisting of rubber, polychloroprene, nitrile, nitrile butadiene rubber, cyanocarbons, styrene butadiene rubber, ethylene propylene rubber and a combination thereof.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is generally directed to a license plate holder, which may be utilized in various manners and on various objects, including but not limited to, land-based vehicles, water-based vehicles, air-based vehicles, aerospace vehicles, and a combination thereof. Moreover, the license plate holder may be configured for use in various environments, including corrosive environments, such as acidic or basic environments, and the like. The license plate holders of the embodiments herein may be generally flexible and configured to undergo repetitive stresses without catastrophic failure or fatigue. In the detailed description that follows, the features of the present invention will be described in the attachment of a license registration plate on to an existing trailer frame as found in for example a trailer used to haul a Jetski or other recreational boat. The invention may also be used for rugged attachment of a license plate to any other form of a trailer requiring a hanging or suspended plate from a light fixture or trailer frame component such as for example a motorcycle trailer.

Figure 1:
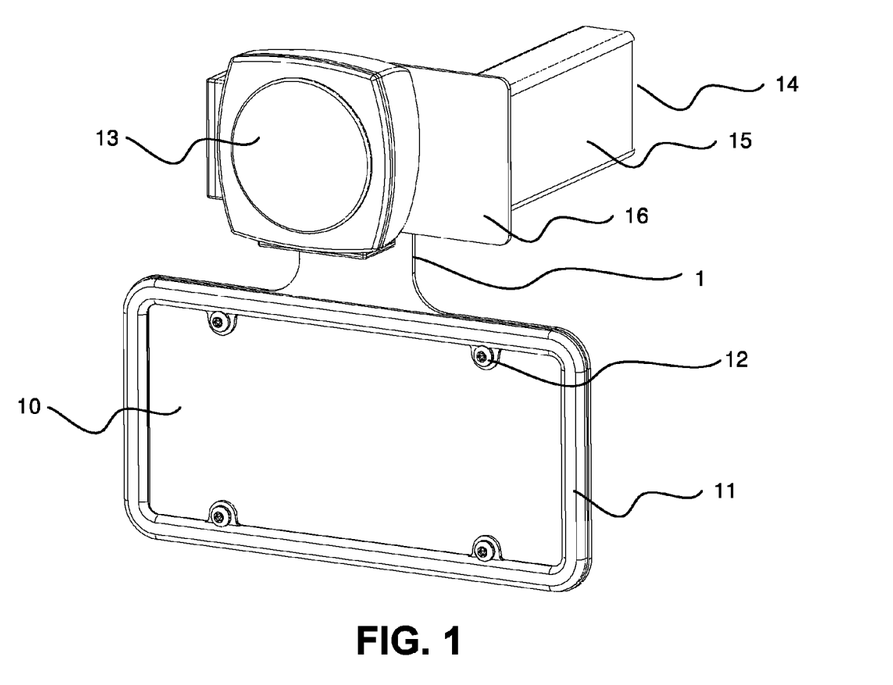
FIG. 1 includes a front view of a license plate holder assembly according to an embodiment.
Figure 2:
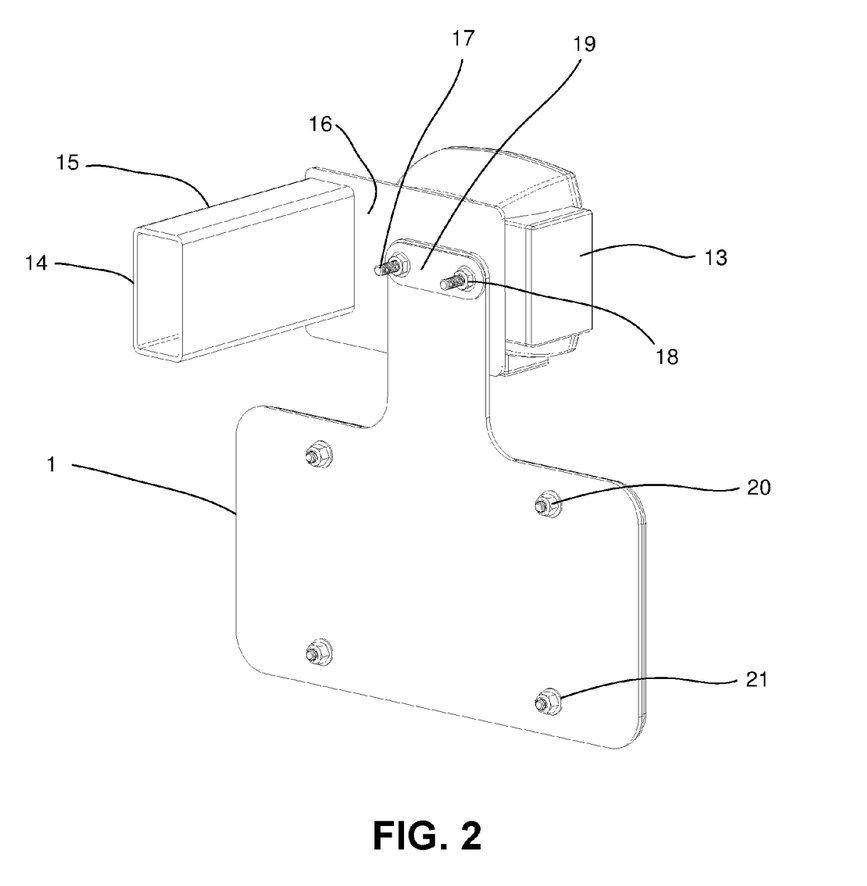
FIG. 2 includes a rear-view of a license plate holder assembly according to an embodiment.

According to one embodiment, a license plate holder assembly is depicted in FIG. 1 and FIG. 2 from front and rear views, respectively. The license plate holder assembly can include a flexible body 1, having a "T-shape" contour and openings extending through the flexible body. As further illustrated, the license plate holder assembly can be mounted onto a trailer 14 having a structural beam 15 and a lamp support bracket 16 that provides means for mounting trailer lamp 13 and flexible body 1. The flexible body 1 having been suspended and held on bracket 16 provides means to support and fasten the license plate 10 to the flexible body. A license plate frame 11 may be included in the license plate assembly, and may be added to cover the license plate 10 by one or more fasteners 12. The license plate holder may be further secured using conventional means, including for example, plate washers 21 and plate nuts 20. The license plate frame 11 may be fabricated by any common methods, including but not limited to, sheet metal formation, plastic injection molding, and aluminum casting.

The flexible body can be mounted to the bracket 16 utilizing existing threaded studs 17 typically included as part of the light assembly 13. The threaded studs 17 can pass through openings in the bracket 16 and flexible body 1. The flexible body 1 and light assembly 13 can be fastened using a plurality of nuts 18 mounted over the threaded studs 17. The oval washer 19 may be utilized to distribute the stress and prevent tearing of the flexible body 1, particularly, at the openings configured to engage the fasteners. A plurality of flat washers may be substituted for the oval washer 19. The oval washer 19 or flat washers may be placed between holder 1 and nut 18.

Figures 3, 4, 5:
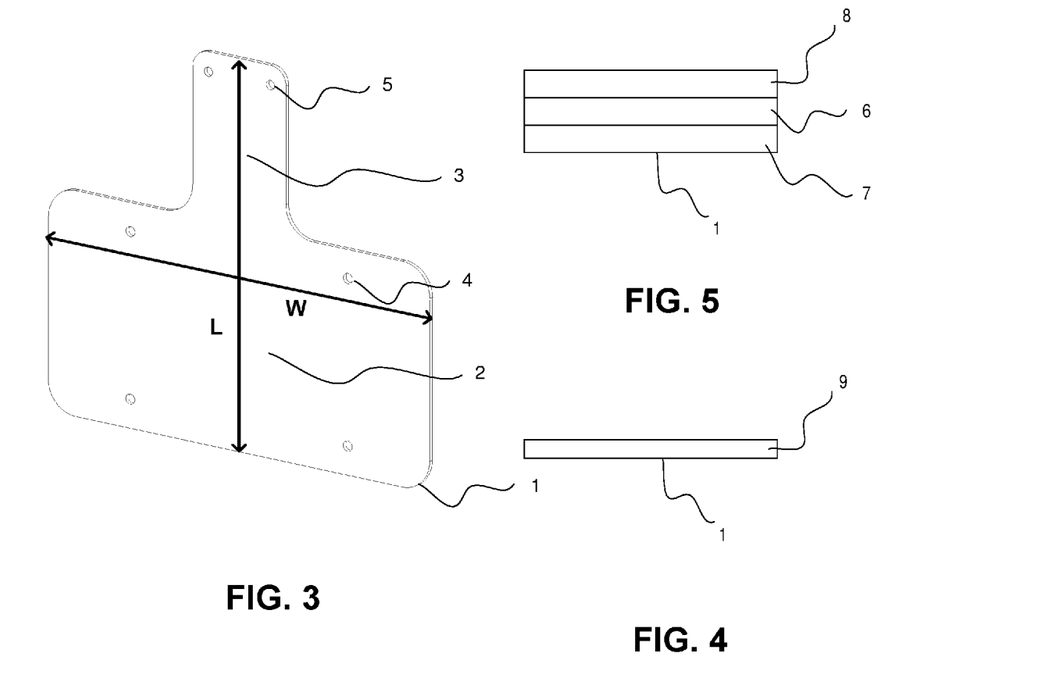
FIG. 3 includes a perspective view of a flexible body of a license plate holder according to an embodiment.
FIG. 4 includes a cross-sectional view of a flexible body of a license plate holder according to an embodiment.
FIG. 5 includes a cross-sectional view of a flexible body of a license plate holder according to an embodiment.

FIG. 3 includes a perspective view of a flexible body of a license plate holder according to an embodiment. In one aspect, the flexible body 1 can include a generally planar two-dimensional shape as viewed in a plane defined by the thickness (i.e., the smallest dimension of the flexible body measured as the distance between the major surfaces) and the width (second longest dimension of the body extending along a major surface of the body in a direction perpendicular to the length of the body, wherein the length is the longest dimension of the body extending in the same plane as the major surface of the flexible body 1). Notably, in one particular embodiment, the flexible body 1 has essentially no major changes in contour across the majority, if not the entire, length and width of the flexible body 1.

Notably, the flexible body 1 can have a first major surface 2, which extends in a substantially single plane for a majority of the width (W) and length (L) of the flexible body 1. Furthermore, the flexible body 1 can have a second major surface 3, wherein the second major surface extends in a substantially single plane for a majority of the width and length of the flexible body 1. In certain instances, the flexible body 1 can have limited contours, particularly on the major surfaces of the flexible body 1. For example, the flexible body may be essentially free of undulations or features in the major surfaces, including for example, but not limited to, protrusions and grooves. Such a design may facilitate improved resistance to failure of the body when subject to stress.

In one particular embodiment, the flexible body 1 can include a single layer of material. FIG. 4 includes a cross-sectional image of a flexible body according to an embodiment, wherein the flexible body 1 is formed of a single layer of material. In certain instances, the flexible body 1 may be a monolithic body consisting essentially of the single layer of material 9.

The single layer of material 9 may include a material, such as a polymer material. Some suitable polymer materials may be selected from the group consisting of rubber, polychloroprene, nitrile, nitrile butadiene rubber, cyanocarbons, styrene butadiene rubber, ethylene propylene rubber, polypropylene, polyethylene, a blend of polypropylene and polyethylene, and a combination thereof. More particularly, the single layer of material 9 may consist essentially of an elastomer. In another instance, the single layer of material 9 can consist essentially of rubber. For another embodiment, the single layer of material 9 can consist essentially of polychloroprene. According to yet another embodiment, the single layer of material 9 can consist essentially of nitrile. For at least one non-limiting embodiment, the single layer of material 9 can consist essentially of nitrile butadiene rubber. For another design of the embodiments herein, the single layer of material 9 can consist essentially of a cyanocarbon. In yet another embodiment, the single layer of material 9 can consist essentially of styrene butadiene rubber. And in yet another embodiment, the single layer of material 9 can consist essentially of ethylene propylene rubber.

The flexible body 1, and in particular, the single layer of material 9, can include one or more fillers, which may be present in an amount suitable to facilitate improved performance. The filler may include a material selected from the group consisting of powders, granules, spheres, fibers, chopped strand fibers (CSF) and a combination thereof. The filler can include a material selected from the group consisting of an inorganic material, an organic material, and a combination thereof. For example, in certain instances, the filler can include a material selected from the group consisting of sand, bubble alumina, chromites, magnesite, dolomites, mullite, borides, dioxides, carbon products, silicon carbide, wood flour, clay, talc, nitrides, disulfides, feldspar, nepheline syenite, glass, $CaF_2$, $KBF_4$, fluorides, pyrite, ZnS, copper sulfide, mineral oil, fluorides, carbonates, calcium carbonate, sulphates, natural materials (e.g., wool), chlorides (e.g., $MnCl2$, KCl). In particular instances the filler can be particulate material, having a distinct size, and forming a discrete, discontinuous phase within the volume of the single layer of material.

In certain instances, the filler can have an average particle size that may facilitate improved performance of the flexible body. For example, the filler can have an average particle size of at least about 1 microns, such as at least about 10 microns, at least about 20 microns, such as at least about 50 microns, at least about 80 microns, at least about 100 microns, at least about 150 microns, at least about 200 microns, at least about 300 microns, at least about 400 microns, at least about 500 microns, at least about 600 microns, at least about 800 microns, at least about 1000 microns, at least about 1200 microns, at least about 1500 microns, at least about 1600 microns, at least about 1700 microns, or even at least about 1800 microns. Still, in another non-limiting embodiment, the filler can have an average particle size of not greater than about 10 mm, such as not greater than about 5 mm, not greater than about 4 mm, not greater than about 3 mm, not greater than about 2 mm, or even not greater than about 1 mm. It will be appreciated, that the average particle size may be determined by measuring and averaging the longest dimension (i.e., the length) of the filler particles. The filler can have an average particle size within a range between any of the minimum and maximum values noted above.

According to a particular embodiment, the flexible body 1, and more particularly, the single layer of material 9, can have a particular content of fillers. For example, the flexible body 1, and in particular, the single layer of material 9 can have not greater than about 40 vol % filler for the total volume of the single layer of material 9. In a particular instance, the single layer of material 9 can have not greater than about 35 vol %, such as not greater than about 30 vol %, not greater than about 25 vol %, not greater than about 20 vol %, not greater than about 15 vol %, not greater than about 10 vol %, not greater than about 8 vol %, not greater than about 5 vol %, not greater than about 4 vol %, not greater than about 3 vol %, not greater than about 2 vol %, not greater than about 1.5 vol %, not greater than about 1 vol %, not greater than about 0.8 vol %, not greater than about 0.5 vol %, not greater than about 0.3 vol %, or even not greater than about 0.1 vol % filler for the total volume of the single layer of material 9. In certain instances, the single layer of material 9 can have at least about 0.001 vol %, such as at least about 0.01 vol %, or even at least about 0.1 vol % filler for the total volume of the single layer of material 9. It will be appreciated that the filler content of the body can be within a range between any of the minimum and maximum percentages noted above. Moreover, the values of the volume percentages noted above can be applicable to weight percentages of the filler material for the total weight of the single layer of material 9.

According to another aspect, the flexible body 1 can include a multilayered or composite design. FIG. 5 includes a cross-sectional image of a portion of the flexible body 1 according to an embodiment. As illustrated, the flexible body 1 can include a first layer 7, a second layer 8, and a first intermediate layer 6 disposed between the first layer 7 and the second layer 8. According to one embodiment, the first layer 7 can include a polymer. In one instance, the first layer 7 can include any one or a combination of materials as described in accordance with the embodiment of FIG. 4 (single layer) herein. For example, the first layer 7 may include an elastomer. More particularly, the first layer 7 may include a material selected from the group consisting of rubber, polychloroprene, nitrile, nitrile butadiene rubber, cyanocarbons, styrene butadiene rubber, and ethylene propylene rubber. Moreover, the first layer 7 may consist essentially of any one or a combination of rubber, polychloroprene, nitrile, nitrile butadiene rubber, cyanocarbons, styrene butadiene rubber, ethylene propylene rubber.

Reference herein to neoprene or polychloroprene includes reference to a family of synthetic rubbers that are produced by polymerization of chloroprene. Notably, certain neoprene materials can exhibit suitable chemical stability and maintains flexibility over a wide temperature range. A nitrile can include an organic compound that has a —C≡functional group.

The second layer 8 may include a polymer material. In certain instances, the second layer 8 may be a polymer material of substantially the same composition as the first layer 7. More particularly, the second layer 8 may be a polymer material of exactly the same composition as the polymer material of the first layer 7. Still, in one non-limiting embodiment, the second layer 8 can include a polymer material having a different composition as compared to the polymer material of the first layer 7.

According to one embodiment, the second layer 8 can include a polymer. In one instance, the second layer 8 can include any one or a combination of materials as described in accorance with the embodiment of FIG. 4 (single layer) herein. For example, the second layer 8 may include an elastomer. More particularly, the second layer 8 may include a material selected from the group consisting of rubber, polychloroprene, nitrile, nitrile butadiene rubber, cyanocarbons, styrene butadiene rubber, and ethylene propylene rubber. Moreover, the second layer 8 may consist essentially of any one or a combination of rubber, polychloroprene, nitrile, nitrile butadiene rubber, cyanocarbons, styrene butadiene rubber, ethylene propylene rubber.

As noted herein, in an embodiment, the flexible body 1 can include an intermediate layer 6 disposed between the first layer 7 and the second layer 8. The intermediate layer 6 can be bonded directly to the first layer 7. The intermediate layer 6 may be bonded directly to the second layer 8. Moreover, in certain instances, the intermediate layer 6 may be a porous material, wherein some content of the first layer 7 and/or second layer 8 are infiltrated within the porosity of the intermediate layer 6.

According to one embodiment, the intermediate layer 6 can include a fabric. More particularly, the intermediate layer 6 may consist essentially of a fabric. The fabric may be a woven material or non-woven material. The intermediate layer 6 may include a fabric and one or more films or coatings on the fabric. The films or coatings may facilitate bonding to the first layer 7 and/or second layer 8. The fabric of the intermediate layer 6 may include a natural or synthetic material. For example, in one embodiment, the fabric can include a natural material, including for example, cotton. In at least one particular embodiment, the fabric of the intermediate layer 6 can consist essentially of cotton. In yet other embodiments, the fabric of the intermediate layer 6 can include a synthetic material, such as nylon. Moreover, for at least one embodiment, the fabric can consist essentially of nylon.

As illustrated, the first layer 7 can have a first thickness (t1) and the second layer 8 can have a second thickness (t2). According to one embodiment, the first thickness (t1) can be different than the second thickness (t2). In another embodiment, the first thickness (t1) can be essentially the same as the second thickness (t2). It will be appreciated that reference to a thickness may include reference to an average or median thickness of the entire layer.

As further illustrated, the intermediate layer 6 can have an intermediate thickness (ti). In certain instances, the first thickness (t1) can be different compared to the intermediate thickness (ti). In particular instances, the first thickness (t1) can be greater than the intermediate thickness (ti). For example, the first thickness (t1) may be at least about 1%, at least about 10%, or even at least about 50% greater than the intermediate thickness (ti). Still, in another embodiment, the first thickness (t1) can be essentially the same as the intermediate thickness (ti).

For another embodiment, the second thickness (t2) can be different with respect to the intermediate thickness (ti). For example, the second thickness (t2) can be greater than the intermediate thickness (ti). For example, the second thickness (t2) may be at least about 1%, at least about 10%, or even at least about 50% greater than the intermediate thickness (ti). Still, in another embodiment, the second thickness (t2) can be essentially the same as the intermediate thickness (ti).

According to one embodiment, the first thickness (t1) may be within a range between about 0.16 inch (0.04 cm) and about 0.094 inches (0.24 cm).

For another instance, the second thickness (t2) may be within a range between about 0.16 inches (0.04 cm) and about 0.094 inches (0.24 cm).

In still another embodiment, the intermediate thickness (ti) can be within a range between about 0.005 inches (0.013 cm) and about 0.94 inches (0.24 cm).

Moreover, the flexible body 1 can have a total thickness (Tt), including the sum of thicknesses of all the component layers, which may be within a range between about 0.063 inch (0.16 cm) to about 1 inch (2.54 cm). Particular values of the total thickness and the thickness of any one of the component layers may be utilized to facilitate the features of the embodiments herein.

Figure 6:
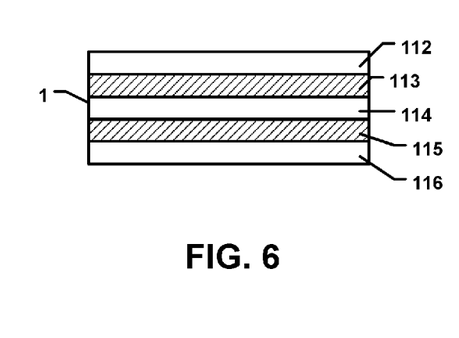
FIG. 6 includes a cross-sectional view of a flexible body of a license plate holder according to an embodiment.

While the foregoing has referenced embodiments include a first layer 7, second layer 8, and intermediate layer 6, it will be appreciated that the composite constructions of the embodiments herein can include any combination and number of layers. For example, the embodiments herein can include multiple intermediate layers, which may or may not be disposed between each of the other layers comprising polymer materials. FIG. 6 includes an illustration of another embodiment, including a first layer 112, a second layer 114, a third layer 116, a first intermediate layer 113 disposed between the first layer 112 and the second layer 114, and a second intermediate layer 115 disposed between the second layer 114 and the third layer 116.

The first layer 112, second layer 114, and third layer 116 can include any of the features of the layers described in embodiments herein, including for example, the first layer 7 of FIG. 5. Notably, the third layer 116 can include a polymer having any of the features of polymer layers according to the embodiments herein. For example, the third layer 116 can include a polymer material having substantially the same composition as the polymer material of the second layer 114. Still, in another embodiment, the polymer material of the third layer 114 can be different compared to the polymer material of the second layer 114. Moreover, in one embodiment, the polymer material of the third layer 116 can be substantially the same as the polymer material of the first layer 112. Still, in another instance, the polymer material of the third layer 116 can be substantially different as compared to the polymer material of the first layer 112.

Moreover, the first intermediate layer 113 and second intermediate layer 115 can include any of the features of the intermediate layers described in the embodiments herein. In particular instances, the second intermediate layer 115 can include a fabric that may be substantially the same fabric of the first intermediate layer. Still, in other instances, the fabric of the second intermediate layer 115 can be different compared to the fabric of the first intermediate layer 113.

Figure 7:
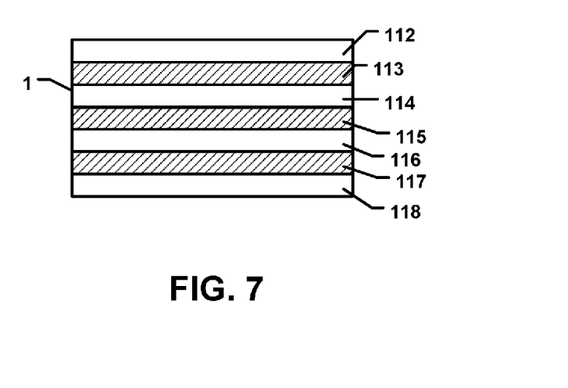
FIG. 7 includes a cross-sectional view of a flexible body of a license plate holder according to an embodiment.

FIG. 7 includes another construction of the flexible body according to an embodiment. As illustrated, the flexible body 1 can include a first layer 112, a second layer 114, a third layer 116, a fourth layer 118, a first intermediate layer 113 disposed between the first layer 112 and the second layer 114, a second intermediate layer 115 disposed between the second layer 114 and the third layer 116, and a third intermediate layer 117 disposed between the third layer 116 and the fourth layer 118. Notably, the fourth layer 118 can include a polymer according to any of the embodiments herein. For example, the fourth layer 118 may include a polymer material having substantially the same composition as the polymer material of the third layer 116. Still, in another embodiment, the polymer material of the fourth layer 118 can be different compared to the polymer material of the third layer 116. Moreover, in one embodiment, the polymer material of the fourth layer 118 can be substantially the same as the polymer material of the second layer 114. Still, in another instance, the polymer material of the fourth layer 118 can be substantially different as compared to the polymer material of the second layer 114. Additionally, in one embodiment, the polymer material of the fourth layer 118 can be substantially the same as the polymer material of the first layer 112. Still, in another instance, the polymer material of the fourth layer 118 can be substantially different as compared to the polymer material of the first layer 112.

The third intermediate layer 117 can include any of the features of any of the intermediate layers according to the embodiments herein. In particular instances, the third intermediate layer 117 can include a fabric that may be substantially the same fabric of the second intermediate layer 115. Still, in other instances, the fabric of the third intermediate layer 117 can be different compared to the fabric of the second intermediate layer 115. Moreover, the third intermediate layer 117 can include a fabric that may be substantially the same fabric of the first intermediate layer 113. Still, in other instances, the fabric of the third intermediate layer 117 can be different compared to the fabric of the first intermediate layer 113.

The flexible body 1, whether in a single layer or multi-layer construction, can have a particular Durometer Shore A hardness facilitating the features of the embodiments herein. For example, the flexible body can have a Durometer Shore A hardness of not greater than about not greater than about 90 A, such as not greater than about 85 A, not greater than about 80 A, not greater than about 75 A, or even not greater than about 73 A. Still, in another instance, the flexible body 1 can have a Durometer Shore A hardness of at least about 5 A, such as at least about 10 A, at least about 20 A, at least about 30 A, at least about 40 A, at least about 50 A, at least about 60 A. It will be appreciated that the Durometer Shore A hardness of the body can be within a range between any of the minimum and maximum values noted above.

Moreover, the flexible body 1, including one or all of the component layers, may have a particular maximum operation temperature facilitating the features of the embodiments herein. For example, the flexible body can have a maximum operation temperature of not greater than about 250° C., and more particularly, within a range between about −34° C. and about 250° C., or more particularly within a range between about −34° C. to 93° C.

Figure 8:
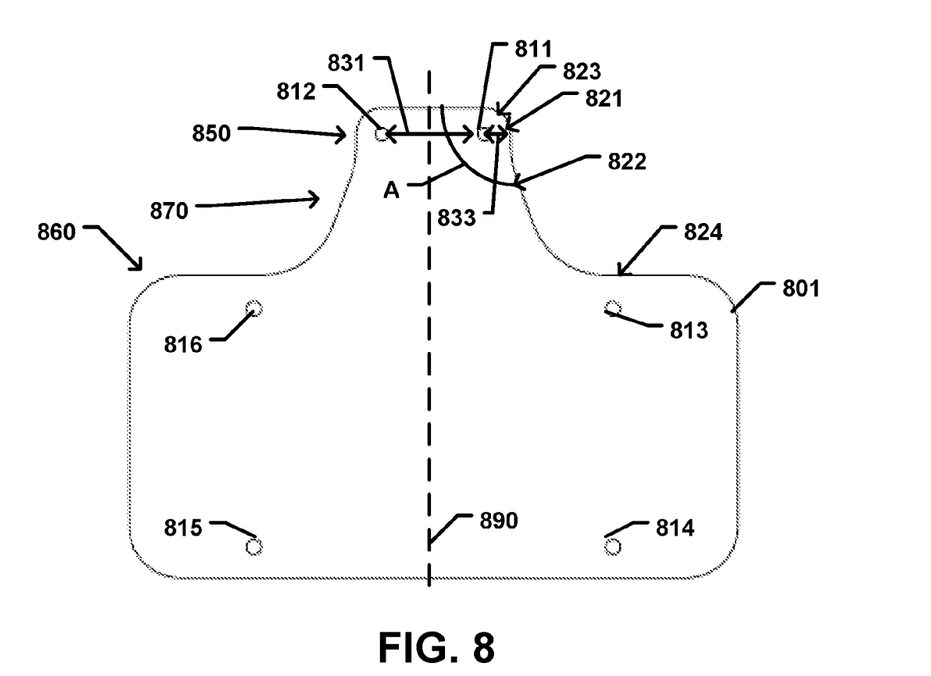
FIG. 8 includes a front view of a flexible body of a license plate holder according to an embodiment.
Figure 9:
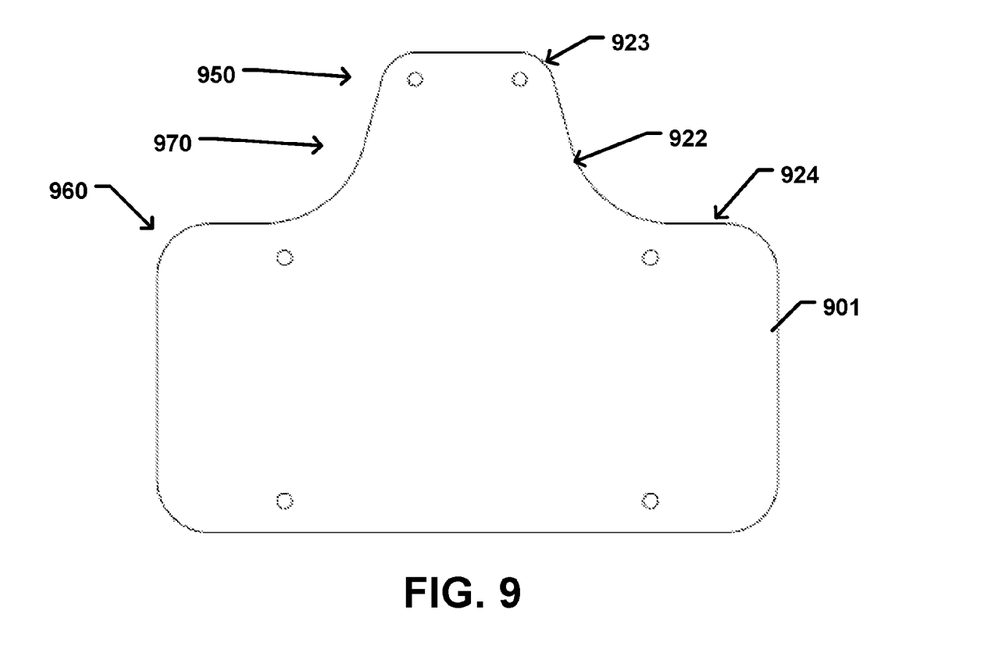
FIG. 9 includes a front view of a flexible body of a license plate holder according to an embodiment.
Figure 10:
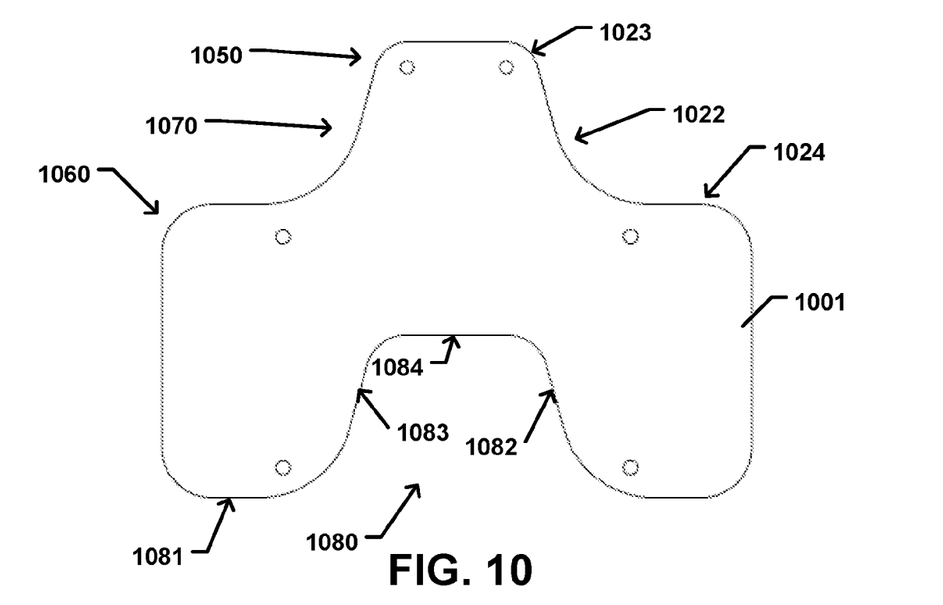
FIG. 10 includes a front view of a flexible body of a license plate holder according to an embodiment.

FIGS. 8-10 address alternative designs of a flexible body having a T-shape contour. Notably, the alternative designs provided in FIGS. 8-10 include bodies of T-shape contours, wherein at least a portion of an edge extending between a top portion and a bottom portion of the flexible body have a particular contour. The alternative designs may be utilized to address concerns of manufacturability and durability. Notably, without wishing to be tied to a particular theory, it has been noted by the inventor that utilization of certain alternative T-shape contour designs of the flexible body may extend the life of the article, particularly when exposed to repetitive stresses.

Referring to FIG. 8, the flexible body 801 can include at least a first opening 811, which may facilitate coupling of a fastener therein and coupling of the flexible body 801 to objects for use as a license plate holder as provided in FIGS. 1 and 2. The first opening 811 can extend through an entire total thickness of the flexible body 801 and may be sized to accept a fastener.

In certain instances, the flexible body 801 can include a second opening 812 spaced apart from the first opening 811. The second opening 812 can extend through an entire thickness of the flexible body 801 and may be sized to accept a fastener. In one embodiment, the first opening and second opening are spaced apart by a distance 831 within a range between about 1.5 inches (3.75 cm) and about 2.5 inches (6.25 cm).

In yet another embodiment, the first opening 811 can be located a particular minimum distance 833 from the exterior edge 821 of the flexible body 801. Control of the minimum distance 833 can facilitate proper formation of the flexible body 801 such that it has sufficient mechanical properties while mitigating the existence of excess material. For example, the minimum distance 833 between the first opening 811 and the exterior edge 821 of the flexible body 801 can be within a range between at least about 0.250 inches (0.63 cm) and not greater than about 0.750 inches (1.88 cm).

Furthermore, as illustrated in FIG. 8 the flexible body can include a T-shape contour having a top portion 850 and a bottom portion 860. Moreover, the flexible body 801 can have at least one exterior edge portion 822 extending between a top portion edge 823 of the top portion 850 and a bottom portion edge 824 of the bottom portion 860. According to one embodiment, at least a portion of the exterior edge 821 comprises a tapered surface, such that a tapered surface of the exterior edge portion 822 can define a tapered region of the flexible body 811 within the neck region 870 extending between the top portion 850 and bottom portion 860. For example, in one particular embodiment, the exterior edge portion 822 can define a tapered slope between the top portion edge 823 and the bottom portion edge 824. The tapered slope may have a substantially linear contour.

As illustrated in FIG. 8, at least a portion of the exterior edge 821 (i.e., the exterior edge portion 822) can define an angle (A) between the top portion edge 823 and the exterior edge portion 822 that is obtuse (i.e., greater than 90 degrees). The angle (A) formed between the top portion edge 823 and the exterior edge portion 822 can be within a range between about 95 degrees and about 150 degrees, such as between about 95 degrees and about 140 degrees.

It will be appreciated that the flexible body 801 may be symmetrical about the axis 890, such that both sides of the flexible body 801 on either side of the axis 890 exhibit the features described herein. In particular instances, the flexible body 801 can have exterior edge portions on either side of the axis 890, wherein each of the exterior edge portions have substantially the same contour.

The openings 813, 814, 815, and 816 may facilitate attachment of a license plate to the flexible body, while openings 811 and 812 can facilitate attachment of the flexible body 801 to a structure (e.g., a portion of a vehicle, etc.). Notably, in such a configuration, the neck region 870 of the flexible body 801 between the top portion 850 and bottom portion 860 is likely exposed to the greatest loads and represent the most likely region of failure. The alternative design of the flexible body 801 according to FIG. 8 may mitigate failure of the flexible body 801 and extend the life of the article.

FIG. 9 includes a front view of a flexible body of a license plate holder according to an embodiment. As illustrated in FIG. 9, the flexible body 901 can include a T-shape contour having a top portion 950, a bottom portion 960, and a neck region 970 extending between the top portion 950 and the bottom portion 960. Moreover, the flexible body 901 can have at least one exterior edge portion 922 extending between a top portion edge 923 and a bottom portion edge 924 within the neck region 970. According to one embodiment, the exterior edge portion 922 can have an arcuate contour. In certain instances, the arcuate contour of the exterior edge portion 922 can be defined by a monotonic curve. In one embodiment, the exterior edge portion 922 can define a substantially concave curvature. For yet another embodiment, the exterior edge portion 922 can be defined by an equation, including but not limited to, polynomial functions (e.g., binomial function, polynomial function of degree 3, etc.), a monotonic function (increasing or decreasing), and the like. In certain other instances, the exterior edge portion can be defined by a trigonometric function, such as a cosine function, sine function, and the like. It will be appreciated that the flexible body 901 can have one or a combination of any of the features of the flexible bodies described in the embodiments herein.

Figure 12:
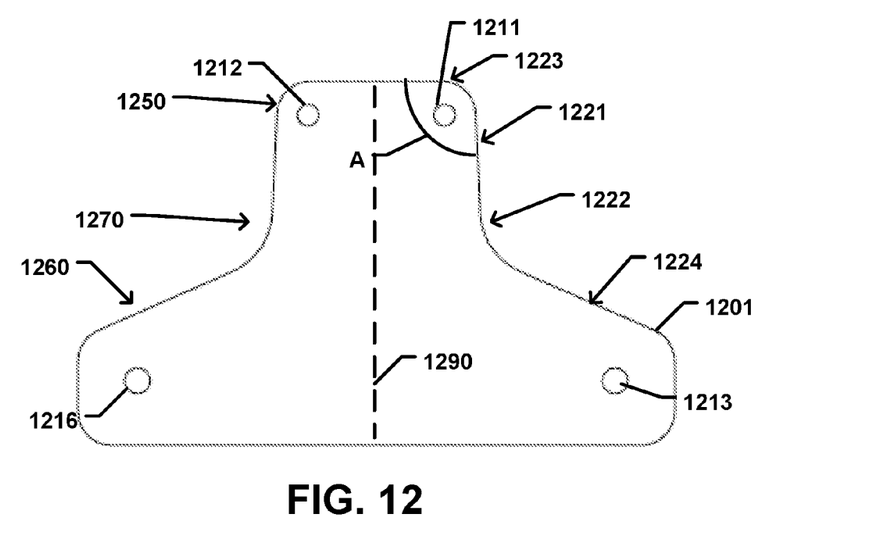
FIG. 12 includes a front view of a flexible body of a license plate holder according to an embodiment.

FIG. 12 includes a front view of a flexible body of a license plate holder according to an embodiment. As illustrated in FIG. 12, the flexible body 1201 can include a T-shape contour having a top portion 1250, a bottom portion 1260, and a neck region 1270 extending between the top portion 1250 and the bottom portion 1260. Moreover, the flexible body 1201 can have at least one exterior edge portion 1222 extending between a top portion edge 1223 and a bottom portion edge 1224 within the neck region 1270. According to one embodiment, the exterior edge portion 1222 can have an arcuate contour. In certain instances, the arcuate contour of the exterior edge portion 1222 can be defined by a monotonic curve. In one embodiment, the exterior edge portion 1222 can define a substantially concave curvature. For yet another embodiment, the exterior edge portion 1222 can be defined by an equation, including but not limited to, polynomial functions (e.g., binomial function, polynomial function of degree 3, etc.), a monotonic function (increasing or decreasing), and the like. In certain other instances, the exterior edge portion can be defined by a trigonometric function, such as a cosine function, sine function, and the like. It will be appreciated that the flexible body 1201 can have one or a combination of any of the features of the flexible bodies described in the embodiments herein.

As illustrated in FIG. 12, at least a portion of the exterior edge 1221 (i.e., the exterior edge portion 1222) can define an angle (A) between the top portion edge 1223 and the exterior edge portion 1222 that is at least 90 degrees. In another embodiment, the angle (A) between the top portion edge 1223 and the exterior edge portion 1222 can be obtuse (i.e., greater than 90 degrees). The angle (A) formed between the top portion edge 1223 and the exterior edge portion 1222 can be within a range between about 90 degrees and about 150 degrees, such as between about 95 degrees and about 140 degrees.

It will be appreciated that the flexible body 1201 may be symmetrical about the axis 1290, such that both sides of the flexible body 1201 on either side of the axis 1290 exhibit the features described herein. In particular instances, the flexible body 1201 can have exterior edge portions on either side of the axis 1290, wherein each of the exterior edge portions have substantially the same contour.

The openings 1213 and 1216 may facilitate attachment of a license plate to the flexible body, while openings 1211 and 1212 can facilitate attachment of the flexible body 1201 to a structure (e.g., a portion of a vehicle, etc.). Notably, in such a configuration, the neck region 1270 of the flexible body 1201 between the top portion 1250 and bottom portion 1260 is likely exposed to the greatest loads and represent the most likely region of failure. The alternative design of the flexible body 1201 according to FIG. 12 may mitigate failure of the flexible body 1201 and extend the life of the article.

FIG. 10 includes a front view of a flexible body of a license plate holder according to an embodiment. As illustrated in FIG. 10, the flexible body 1001 can include a T-shape contour having a top portion 1050, a bottom portion 1060, and a neck region 1070 extending between the top portion 1050 and the bottom portion 1060. Moreover, the flexible body 1001 can have at least one exterior edge portion 1022 extending between a top portion edge 1023 and a bottom portion edge 1024 within the neck region 1070. According to one embodiment, the exterior edge portion 1022 can have an arcuate contour, and more particularly may define a concave curvature. In certain instances, the concave curvature of the exterior edge portion 1022 may be a complex concave curvature, wherein the contour is a non-monotonic concave curvature.

As further illustrated, the bottom portion 1060 can have cut-out region 1080. The cut-out region 1080 may be formed such that is centered along a bottom edge 1081 of the bottom portion 1060. Moreover, the cut-out region 1080 can have a first side edge portion 1082, a second side edge portion 1083, and a connection edge 1084 extending between and joining the first side edge portion 1082 and the second side edge portion 1083. In a particular embodiment, the first side edge portion 1082 can have substantially the same contour as the exterior edge portion 1022 within the neck region 1070. Without wishing to be tied to a particular theory, it is noted that formation of a cut-out region 1080 may reduce the weight of the flexible body 1001, reduce the load on the neck region 1070, and reduce the likelihood of mechanical failures within the flexible body 1001. The cut-out region 1080 may also facilitate improved manufacturability of the flexible body 1001.

Figure 11:
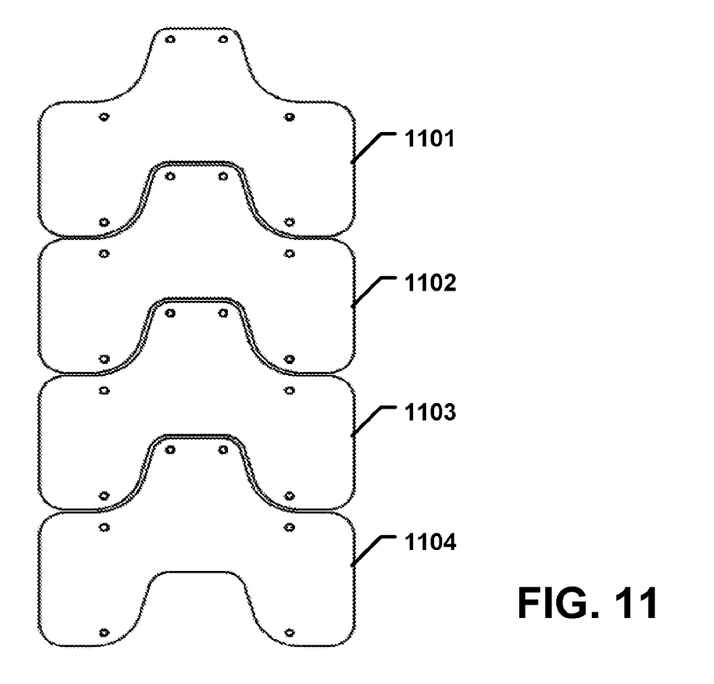
FIG. 11 includes a front view of a plurality of flexible bodies according to an embodiment.

Moreover, the flexible body 1001 of FIG. 10 can improve manufacturability. FIG. 11 includes a front view of a plurality of flexible bodies 1101, 1102, 1103, and 1104 according to an embodiment. As illustrated, in FIG. 11, the flexible bodies 1101-1104 may be manufactured by cutting the shapes from a larger piece of material, and such a design can reduce waste while maintaining performance of the flexible bodies 1101-1104.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below Embodiments:

Embodiment 1. A license plate holder comprising:
a flexible body having a T-shape contour and comprising:
first layer comprising a polymer
a second layer comprising a polymer;
a first intermediate layer disposed between the first layer and the second layer comprising a fabric;
and at least a first opening.

Embodiment 2. The license plate holder of embodiment 1, wherein the polymer of the first layer has substantially the same composition as the polymer of the second layer.

Embodiment 3. The license plate holder of embodiment 1, wherein the first layer comprises an elastomer.

Embodiment 4. The license plate holder of embodiment 1, wherein the first layer comprises a material selected from the group consisting of rubber, polychloroprene, nitrile, nitrile butadiene rubber, cyanocarbons, styrene butadiene rubber, ethylene propylene rubber.

Embodiment 5. The license plate holder of embodiment 1, wherein the second layer comprises an elastomer.

Embodiment 6. The license plate holder of embodiment 1, wherein the second layer comprises a material selected from the group consisting of rubber, polychloroprene, nitrile, nitrile butadiene rubber, cyanocarbons, styrene butadiene rubber, ethylene propylene rubber.

Embodiment 7. The license plate holder of embodiment 1, wherein the fabric of the intermediate layer comprises a natural or synthetic material.

Embodiment 8. The license plate holder of embodiment 1, wherein the fabric comprises a natural material including cotton.

Embodiment 9. The license plate holder of embodiment 1, wherein the fabric consists essentially of cotton.

Embodiment 10. The license plate holder of embodiment 1, wherein the fabric comprises a synthetic material including nylon.

Embodiment 11. The license plate holder of embodiment 1, wherein the fabric comprises a synthetic material consisting essentially of nylon.

Embodiment 12. The license plate holder of embodiment 1, wherein the first layer comprises a first thickness, the second layer comprises a second thickness, and wherein the first thickness is different than the second thickness.

Embodiment 13. The license plate holder of embodiment 1, wherein the first layer comprises a first thickness, the second layer comprises a second thickness, and wherein the first thickness is substantially the same as the second thickness.

Embodiment 14. The license plate holder of embodiment 1, wherein the first layer comprises a first thickness, the intermediate layer comprises an intermediate thickness, and wherein the first thickness is different than the intermediate thickness.

Embodiment 15. The license plate holder of embodiment 1, wherein first thickness is greater than the intermediate thickness.

Embodiment 16. The license plate holder of embodiment 1, wherein the first opening extends through an entire thickness of the body.

Embodiment 17. The license plate holder of embodiment 1, wherein the first opening is sized to accept a fastener.

Embodiment 18. The license plate holder of embodiment 1, further comprising a second opening spaced apart from the first opening, wherein the first opening and second opening are spaced apart by a distance within a range between about 1.5 inches (3.75 cm) and about 2.5 inches (6.25 cm).

Embodiment 19. The license plate holder of embodiment 1, wherein the first opening is located a minimum distance of at least about 0.250 inches (0.63 cm) and not greater than about 0.750 inches (1.88 cm) from an exterior edge of the body.

Embodiment 20. The license plate holder of embodiment 1, wherein the body comprises a generally planar two-dimensional shape as viewed in plane defined by the thickness and width.

Embodiment 21. The license plate holder of embodiment 1, further comprising a frame configured to overlie at least a portion of the body.

Embodiment 22. The license plate holder of embodiment 1, wherein the flexible body has a first major surface, and wherein the first major surface extends in a substantially single plane for a majority of the width and length of the flexible body.

Embodiment 23. The license plate holder of embodiment 1, wherein the flexible body has a first major surface, and wherein the first major surface extends in a substantially single plane for the entire width and length of the flexible body.

Embodiment 24. The license plate holder of embodiment 1, wherein the flexible body has a second major surface, and wherein the first major surface extends in a substantially single plane for a majority of the width and length of the flexible body.

Embodiment 25. The license plate holder of embodiment 1, wherein the opening extends through an entire thickness of the flexible body.

Embodiment 26. The license plate holder of embodiment 1, wherein the flexible body comprises essentially no major contours.

Embodiment 27. The license plate holder of embodiment 1, wherein the flexible body comprises a Durometer Shore A hardness of not greater than about not greater than about 90 A, not greater than about 85 A, not greater than about 80 A, not greater than about 75 A, not greater than about 73 A, and at least about 5 A, at least about 10 A, at least about 20 A, at least about 30 A, at least about 40 A, at least about 50 A, at least about 60 A.

Embodiment 28. The license plate holder of embodiment 1, wherein the flexible body comprises a maximum operation temperature of not greater than about 250° C., within a range between about −34° C. and about 250° C., within a range between about −34° C. and about 93° C.

Embodiment 29. The license plate holder of embodiment 1, further comprising:
a third layer comprising a polymer; and
a second intermediate layer disposed between the second layer and the third layer.

Embodiment 30. The license plate holder of embodiment 1, wherein the polymer of the third layer has substantially the same composition as the polymer of the second layer.

Embodiment 31. The license plate holder of embodiment 1, wherein the third layer comprises an elastomer.

Embodiment 32. The license plate holder of embodiment 1, wherein the third layer comprises a material selected from the group consisting of rubber, polychloroprene, nitrile, nitrile butadiene rubber, cyanocarbons, styrene butadiene rubber, ethylene propylene rubber.

Embodiment 33. The license plate holder of embodiment 1, wherein the second intermediate layer comprises a fabric.

Embodiment 34. The license plate holder of embodiment 1, wherein of the second intermediate layer comprises a natural or synthetic material.

Embodiment 35. The license plate holder of embodiment 1, wherein the fabric comprises a natural material including cotton.

Embodiment 36. The license plate holder of embodiment 1, wherein the fabric consists essentially of cotton.

Embodiment 37. The license plate holder of embodiment 1, wherein the fabric comprises a synthetic material including nylon.

Embodiment 38. The license plate holder of embodiment 1, wherein the fabric comprises a synthetic material consisting essentially of nylon.

Embodiment 39. The license plate holder of embodiment 1, further comprising:
a fourth layer comprising a polymer; and
a second intermediate layer disposed between the second layer and the third layer.

Embodiment 40. A license plate holder comprising:
a flexible body having a T-shape contour and comprising a single layer of material comprising a material selected from the group consisting of rubber, polychloroprene, nitrile, nitrile butadiene rubber, cyanocarbons, styrene butadiene rubber, ethylene propylene rubber and a combination thereof.

Embodiment 41. The license plate holder of embodiment 40, wherein the body is a monolithic body consisting of the single layer of material.

Embodiment 42. The license plate holder of embodiment 40, wherein the single layer consists essentially of an elastomer.

Embodiment 43. The license plate holder of embodiment 40, wherein the single layer consists essentially of rubber.

Embodiment 44. The license plate holder of embodiment 40, wherein the single layer consists essentially of polychloroprene.

Embodiment 45. The license plate holder of embodiment 40, wherein the single layer consists essentially of nitrile.

Embodiment 46. The license plate holder of embodiment 40, wherein the single layer consists essentially of nitrile butadiene rubber.

Embodiment 47. The license plate holder of embodiment 40, wherein the single layer consists essentially of a cyanocarbon.

Embodiment 48. The license plate holder of embodiment 40, wherein the single layer consists essentially of styrene butadiene rubber.

Embodiment 49. The license plate holder of embodiment 40, wherein the single layer consists essentially of ethylene propylene rubber.

Embodiment 50. The license plate holder of any one of embodiments 1 and 40, wherein the flexible body comprises an exterior edge portion extending between a bottom portion and a top portion and defining a tapered contour.

Embodiment 51. The license plate holder of any one of embodiments 1 and 40, wherein the flexible body comprises an exterior edge portion extending between a bottom portion and a top portion and defining an arcuate contour.

Embodiment 52. The license plate holder of any one of embodiments 1 and 40, wherein the flexible body comprises an exterior edge portion extending between a bottom portion and a top portion and defined by a trigonometric function.

Embodiment 53. The license plate holder of any one of embodiments 1 and 40, wherein the flexible body comprises an exterior edge portion extending between a bottom portion and a top portion and having a substantially linear contour.

Embodiment 54. The license plate holder of any one of embodiments 1 and 40, wherein the flexible body comprises an exterior edge portion extending between a bottom portion and a top portion and having a substantially concave contour.

Embodiment 55. The license plate holder of embodiment 40, further comprising a first opening extending through an entire thickness of the body and sized to accept a fastener.

Embodiment 56. The license plate holder of embodiment 55, further comprising a second opening spaced apart from the first opening, wherein the first opening and second opening are spaced apart by a distance within a range between about 1.5 inches (3.75 cm) and about 2.5 inches (6.25 cm).

Embodiment 57. The license plate holder of embodiment 40, wherein the flexible body has a first major surface, and wherein the first major surface extends in a substantially single plane for the entire width and length of the flexible body.

Embodiment 58. The license plate holder of embodiment 57, wherein the flexible body has a second major surface, and wherein the first major surface extends in a substantially single plane for a majority of the width and length of the flexible body.

Embodiment 59. The license plate holder of embodiment 40, the flexible body comprises essentially no major contours.

Embodiment 60. The license plate holder of embodiment 40, wherein the flexible body comprises a Durometer Shore A hardness of not greater than about not greater than about 90 A, not greater than about 85 A, not greater than about 80 A, not greater than about 75 A, not greater than about 73 A, and at least about 5 A, at least about 10 A, at least about 20 A, at least about 30 A, at least about 40 A, at least about 50 A, at least about 60A.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A license plate holder for attaching a license plate to a structure comprising:
a flexible body having a T-shape contour and comprising:
a first layer comprising a polymer;
a second layer comprising a polymer;

a first intermediate layer disposed between the first layer and the second layer comprising a fabric;

a top portion having at least a first opening and configured to facilitate attachment of the license plate holder to the structure;

a bottom portion having at least one opening and configured to facilitate attachment of the license plate to the license plate holder; and a neck region extending between the top portion and the bottom portion, the neck region configured to be flexible in order to mitigate failure of the license plate holder.

2. The license plate holder of claim 1, wherein the first layer comprises a material selected from the group consisting of rubber, polychloroprene, nitrile, nitrile butadiene rubber, cyanocarbons, styrene butadiene rubber, ethylene propylene rubber.

3. The license plate holder of claim 1, wherein the second layer comprises a material selected from the group consisting of rubber, polychloroprene, nitrile, nitrile butadiene rubber, cyanocarbons, styrene butadiene rubber, ethylene propylene rubber.

4. The license plate holder of claim 1, wherein the fabric comprises a natural material including cotton.

5. The license plate holder of claim 1, wherein the fabric comprises a synthetic material including nylon.

6. The license plate holder of claim 1, wherein the first layer comprises a first thickness, the second layer comprises a second thickness, and wherein the first thickness is different than the second thickness.

7. The license plate holder of claim 1, wherein the first layer comprises a first thickness, the second layer comprises a second thickness, and wherein the first thickness is substantially the same as the second thickness.

8. The license plate holder of claim 1, further comprising a second opening spaced apart from the first opening, wherein the first opening and second opening are spaced apart by a distance within a range between about 1.5 inches (3.75 cm) and about 2.5 inches (6.25 cm).

9. The license plate holder of claim 1, wherein the first opening is located a minimum distance of at least about 0.250 inches (0.63 cm) and not greater than about 0.750 inches (1.88 cm) from an exterior edge of the body.

10. The license plate holder of claim 1, wherein the body comprises a generally planar two-dimensional shape as viewed in plane defined by the thickness and width.

11. The license plate holder of claim 1, wherein the flexible body comprises a Durometer Shore A hardness of not greater than about not greater than about 90 A, and at least about 5 A.

12. The license plate holder of claim 1, further comprising:

a third layer comprising a polymer; and a second intermediate layer disposed between the second layer and the third layer.

13. The license plate holder of claim 1, further comprising:

a fourth layer comprising a polymer; and a second intermediate layer disposed between the second layer and the third layer.

14. A license plate holder for attaching a license plate to a structure comprising:

a flexible body having a T-shape contour and comprising a single layer of material comprising a material selected from the group consisting of rubber, polychloroprene, nitrile, nitrile butadiene rubber, cyanocarbons, styrene butadiene rubber, ethylene propylene rubber and a combination thereof, the flexible body further comprising:

a top portion having at least a first opening and configured to facilitate attachment of the license plate holder to the structure;

a bottom portion having at least one opening and configured to facilitate attachment of the license plate to the license plate holder; and a neck region extending between the top portion and the bottom portion, the neck region configured to be flexible in order to mitigate failure of the license plate holder.

15. The license plate holder of claim 14, wherein the body is a monolithic body consisting of the single layer of material.

16. The license plate holder of claim 14, wherein the flexible body comprises an exterior edge portion extending between a bottom portion and a top portion and defining a tapered, arcuate, substantially linear, or substantially concave contour.

17. The license plate holder of claim 14, wherein the first opening extends through an entire thickness of the body and is sized to accept a fastener.

18. The license plate holder of claim 17, further comprising a second opening spaced apart from the first opening, wherein the first opening and second opening are spaced apart by a distance within a range between about 1.5 inches (3.75 cm) and about 2.5 inches (6.25 cm).

19. The license plate holder of claim 14, wherein the flexible body has a first major surface, and wherein the first major surface extends in a substantially single plane for the entire width and length of the flexible body.

20. The license plate holder of claim 14, wherein the flexible body comprises an exterior edge portion extending between the bottom portion and the top portion and defining a tapered, arcuate, substantially linear, or substantially concave contour.

* * * * *